United States Patent
Koga

(10) Patent No.: US 10,895,558 B2
(45) Date of Patent: Jan. 19, 2021

(54) FLOW CONTROLLER AND GAS CHROMATOGRAPH EQUIPPED WITH THE SAME

(71) Applicant: Shimadzu Corporation, Kyoto (JP)

(72) Inventor: Kiyonori Koga, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 291 days.

(21) Appl. No.: 15/843,356

(22) Filed: Dec. 15, 2017

(65) Prior Publication Data

US 2019/0187111 A1  Jun. 20, 2019

(51) Int. Cl.
| | |
|---|---|
| *G01N 1/00* | (2006.01) |
| *G01N 30/34* | (2006.01) |
| *G01N 30/12* | (2006.01) |
| *G01N 30/32* | (2006.01) |
| G01N 30/02 | (2006.01) |
| B01D 53/02 | (2006.01) |

(52) U.S. Cl.
CPC .............. *G01N 30/34* (2013.01); *G01N 30/12* (2013.01); *G01N 30/32* (2013.01); *B01D 53/025* (2013.01); *G01N 2030/025* (2013.01)

(58) Field of Classification Search
None
See application file for complete search history.

(56) References Cited

U.S. PATENT DOCUMENTS

| | | | | |
|---|---|---|---|---|
| 6,447,581 B2* | 9/2002 | Gellert | ................... | G01N 30/32 96/102 |
| 9,719,829 B2* | 8/2017 | Matsuura | .............. | G01F 15/005 |
| 2005/0109079 A1* | 5/2005 | Furukawa | .............. | G01N 30/20 73/23.42 |
| 2013/0087230 A1* | 4/2013 | Yasuda | ................. | F16K 27/003 137/597 |
| 2017/0023534 A1* | 1/2017 | McCauley | ............. | G01N 30/18 |
| 2017/0285666 A1* | 10/2017 | Ohtani | ................... | H05K 1/181 |

OTHER PUBLICATIONS

Katerberg, M. (Aug. 17, 2017). The right design and components for accurate low-flow measurement. Retrieved from https://www.flowcontrolnetwork.com/home/article/15563786/the-right-design-and-connponents-for-accurate-lowflow-nneasurennent.*

* cited by examiner

*Primary Examiner* — Alexander A Mercado
(74) *Attorney, Agent, or Firm* — Muir Patent Law, PLLC

(57) ABSTRACT

A flow controller having high workability and a gas chromatograph equipped with the same are provided. A carrier gas controller is equipped with a flow path member. The flow path member is equipped with a first portion and a second portion extending horizontally from an upper end portion of the first portion. In the second portion, a gas outlet port is formed. An $H_2$ gas controller is equipped with a flow path member. The flow path member is equipped with a first portion and a second portion extending horizontally from an upper end portion of the first portion. In the second portion, a gas outlet port is formed. For this reason, a sufficient working space for the gas outlet port can be secured. Further, a sufficient working space for the gas outlet port can be secured. In other words, the workability with respect to the carrier gas controller and the $H_2$ gas controller can be kept high.

18 Claims, 5 Drawing Sheets

FLOW CONTROLLER AND GAS CHROMATOGRAPH EQUIPPED WITH THE SAME

TECHNICAL FIELD

The present invention relates to a flow controller for controlling a flow rate of a gas used in a gas chromatograph, and a gas chromatograph equipped with the flow controller.

BACKGROUND ART

Conventionally, as a flow controller to be equipped in a gas chromatograph, a gas chromatograph equipped with a flow path assembly formed by stacking a plurality of metal plates is known (see, for example, Patent Document 1 listed below).

In a gas chromatograph of this type, a carrier gas flow path is formed in the flow path assembly. During measurement of a sample, a carrier gas flows into the carrier gas flow path.

FIG. 5 is a conceptual diagram showing the configuration of a flow controller 101 and its vicinity thereof in a conventional gas chromatograph 100. The gas chromatograph 100 is equipped with the flow controller 101, pipes 102, and a sample vaporization chamber 103.

The flow controller 101 is equipped with a flow path assembly 104. The flow path assembly 104 is constituted by stacking a plurality of metal plates so that a carrier gas flow path is formed inside. Valves and various sensors (not shown) are arranged on the metal plate constituting the flow path assembly 104. The valves and various sensors attached to the flow path assembly 104 are connected to a middle portion of the carrier gas flow path formed in the flow path assembly 104.

When measuring a sample, in the gas chromatograph 1, a carrier gas flows into the carrier gas flow path of the flow path assembly 104 in a state in which the valve is open. A predetermined amount of the carrier gas is introduced into the sample vaporization chamber 103 via the pipe 102 by feedback control of the valve while the state of the carrier gas such as the flow rate and the pressure is detected by the various sensors.

PRIOR ART PATENT DOCUMENT

Patent Document 1: Japanese Unexamined Patent Application Publication No. 2005-156214

SUMMARY OF THE INVENTION

Problems to be Solved

In the gas chromatograph 1 using the conventional flow controller 101 as described above, the working space for the flow path assembly 104 is narrow. In particular, in cases where a plurality of flow controllers 101 are arranged side by side, the working space for the flow path assembly 104 is narrower. Therefore, in the gas chromatograph 100, flow path side pipes 105 are extended from the flow path assembly 104. A worker connects the flow path side pipes 105 to the vaporization chamber side pipes 106 extending from the sample vaporization chamber 103 via connecting members 107, so that pipes 102 extending from the flow path assembly 104 to the sample vaporization chamber 103 are formed.

However, there is a possibility that impurities, such as, e.g., processing oil, are adhered to the flow path side pipes 105 and the connecting members 107 since various processing has been made to them. At the time of measurement, if such impurities are volatilized and mixed into a carrier gas, noise may occur in the measurement data.

The present invention was made in view of the aforementioned circumstances, and aims to provide a flow controller high in workability and a gas chromatograph equipped with the same. The present invention also aims to provide a flow controller capable of improving measurement accuracy and a gas chromatograph equipped with the flow controller.

Means for Solving the Problems

A flow controller according to the present invention is a flow controller for controlling a flow rate of a gas used for a gas chromatograph. The flow controller includes a flow path member constituted by laminating a plurality of plates and having a flow path formed therein. The flow path member is sectioned into a first portion and a second portion by being bent. A gas supply port to which a gas is supplied is formed in the first portion. A gas outlet port through which a gas supplied from the gas supply port and passed through the flow path flows out is formed in the second portion.

According to such a configuration, the second portion is bent from the first portion. In the second portion, a gas outlet port through which the gas flows out is formed.

For this reason, a working space for the gas outlet portion can be sufficiently secured, and therefore workability for the flow controller is high.

Further, in the case of communicating a pipe extending from another part with the gas outlet port, directly connecting the pipe to the second part eliminates the need for connecting a plurality of pipes between the flow controller and another part, which renders the pipe extending from the flow controller and a member for connecting the pipe to another pipe unnecessary.

Therefore, it becomes possible to suppress contamination of impurities into the gas, which in turn can improve the measurement accuracy. In addition, the number of connecting portions is reduced, which in turn can reduce the possibility of gas leakage. Furthermore, since the number of parts can be reduced, the manufacturing cost can be reduced.

(2) In the second portion, a gas inlet port into which a gas from an outside flows may be formed.

According to such a configuration, a working space for the gas inlet port can be sufficiently secured, and therefore the workability for the flow controller is even higher.

Further, in the case of communicating the pipe extending from another part with the gas inlet port, directly connecting the pipe to the second portion eliminates the need for connecting a plurality of pipes between the flow controller and another part, which renders a pipe extending from the flow controller and a member for connecting the pipe to another pipe unnecessary.

(3) The flow controller may further include a filter directly attached to the second portion, the filter being configured to remove impurities from the gas flowing through the flow path.

According to such a configuration, a filter can be directly connected to the second portion bent from the first portion.

For this reason, the working space for attaching/detaching the filter can be assuredly secured, and therefore the workability for the flow controller is even higher.

It is also possible to further suppress contamination of impurities into the gas by the filter, which can further improve the measurement accuracy.

(4) The gas chromatograph according to the present invention includes the flow controller, a column into which a sample is introduced, a sample introduction unit in which a sample vaporization chamber for vaporizing the sample to be introduced into the column is formed, and a detector configured to detect sample components separated in a process of passing through the column.

According to such a configuration, a working space for the gas outlet port of the flow controller can be sufficiently secured, and therefore the workability for the flow controller is even higher.

(5) Further, the gas chromatograph may further include a first pipe for sending a carrier gas from the flow controller to the sample introduction unit. The first pipe is directly connected to the second portion so as to communicate with the gas outlet port.

According to such a configuration, there is no need to connect the first pipe to another pipe between the flow controller and the sample introduction unit, which can eliminate another pipe and a member for connecting the first pipe to another pipe.

Therefore, it becomes possible to suppress contamination of impurities into the gas, which in turn can improve the measurement accuracy. In addition, the number of connecting portions is reduced, which in turn can reduce the possibility of gas leakage. Furthermore, since the number of parts can be reduced, the manufacturing cost can be reduced.

(6) In the second portion, a gas inlet port into which a gas from an outside flows may be formed. The gas chromatograph may be further provided with a second pipe for sending a split gas or a purge gas from the sample introduction unit to the flow controller. The second pipe is directly connected to the second portion so as to communicate with the gas inlet port.

According to such a configuration, a working space for the gas inlet port can be sufficiently secured, and therefore the workability for the flow controller is even higher.

Further, there is no need to connect the second pipe to another pipe between the sample introduction unit and the flow controller, which can eliminate another pipe and a member for connecting the second pipe to another pipe.

(7) Further, the gas chromatograph may further include a third pipe for sending a detection gas from the flow controller to the detector. The third pipe is directly connected to the second portion so as to communicate with the gas outlet port.

According to such a configuration, there is no need to connect the third pipe to another pipe between the flow controller and the detector, which can eliminate another pipe and a member for connect the third pipe to another pipe.

Therefore, it becomes possible to suppress contamination of impurities into the gas, which in turn can improve the measurement accuracy. In addition, the number of connecting portions is reduced, which in turn can reduce the possibility of gas leakage. Furthermore, since the number of parts can be reduced, the manufacturing cost can be reduced.

(8) Further, in the gas chromatograph, a plurality of flow controllers may be provided. In the gas chromatograph, a holder for holding the plurality of flow controllers may be further provided such that the first portions of the plurality of flow controllers are disposed parallel to each other.

According to such a configuration, in a state in which a plurality of flow controller is held in the holder, even if the dimension between a first portion of a flow controller and a first portion of a flow controller adjacent to a certain flow controller is small, the working space for the second portion bent from the first portion of these flow controllers can be sufficiently secured.

As a result, the workability for the flow controller is even higher.

(9) A space surrounded by the first portion and the second portion of the flow controller of one of the flow controllers adjacent to each other and the first portion of the other flow controller may form an accommodation space for accommodating parts to be attached to the first portion of the other flow controller.

According to such a configuration, the space inside the gas chromatograph can be effectively utilized, which in turn can realize the downsizing of the gas chromatograph.

Effects of the Invention

According to the present invention, the working space for the gas outlet port or the gas inlet port can be sufficiently secured, and therefore the workability for the flow controller is even higher. Further, according to the present invention, it is possible to eliminate a pipe extending from the flow controller and a member for connecting the pipe to another pipe, so that contamination of impurities into the gas can be suppressed, which in turn can improve the measurement accuracy.

EMBODIMENTS FOR CARRYING OUT THE INVENTION

1. Exemplary Configuration of Gas Chromatograph

Figure 1:
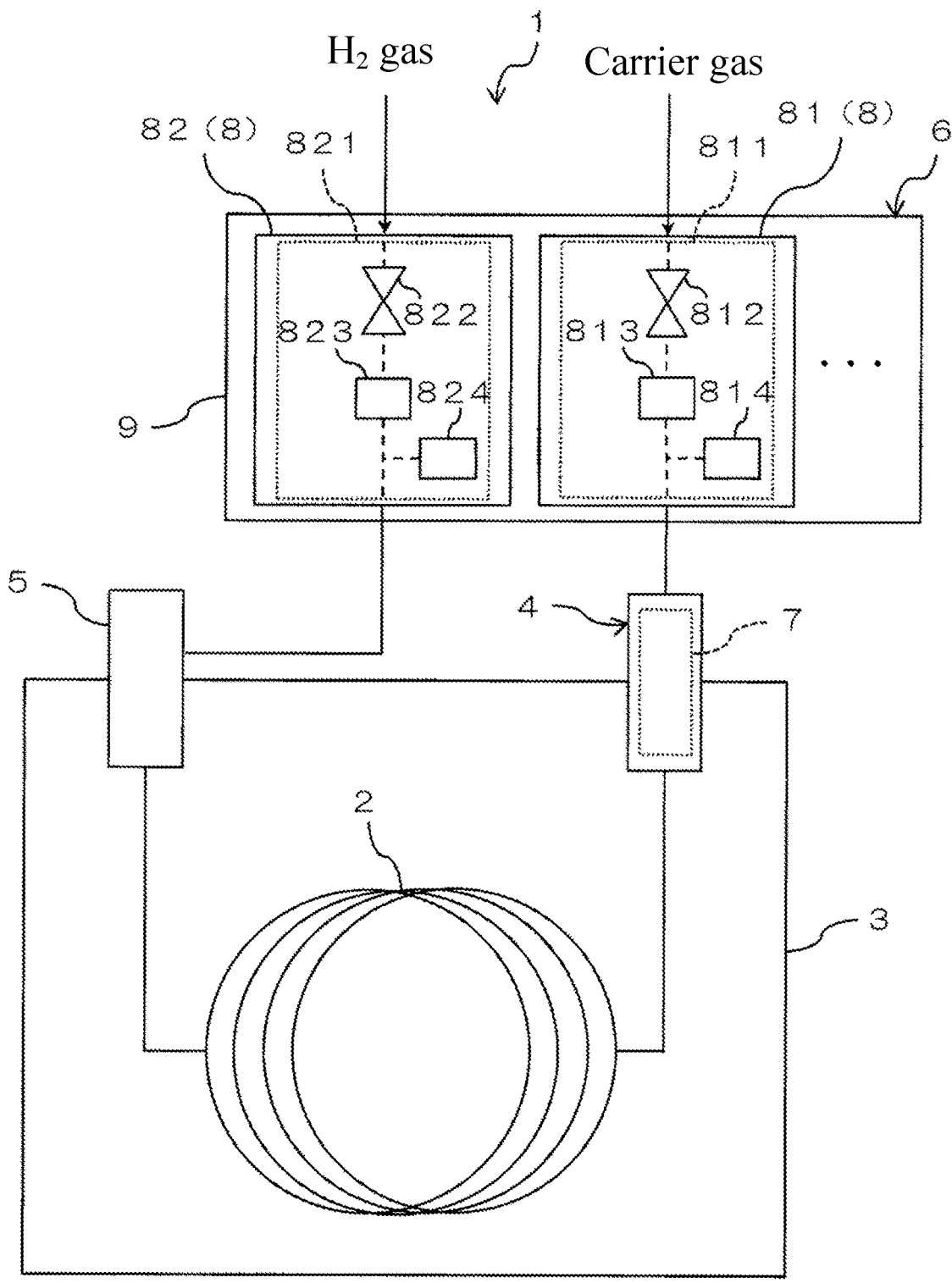
FIG. 1 is a schematic diagram showing a configuration example of a gas chromatograph according to an embodiment of the present invention.

FIG. 1 is a schematic diagram showing a configuration example of a gas chromatograph 1 according to an embodiment of the present invention.

The gas chromatograph 1 is equipped with a column 2, a column oven 3, a sample introduction unit 4, a detector 5, and a flow adjustment unit 6.

The column 2 is, for example, a capillary column. The column 2 is accommodated in the column oven 3 together with a heater (not illustrated), a fan (not illustrated), etc. The column 2 has an upstream end connected to the sample introduction unit 4 and a downstream end connected to the detector 5. To the column 2, a carrier gas is supplied via the flow adjustment unit 6.

The column oven 3 is for heating the column 2. The column oven 3 is capable of performing an isothermal analysis in which an analysis is carried out while keeping the temperature in the column oven 3 constant or a temperature analysis in which an analysis is carried out while gradually increasing the temperature in the column oven 3 by appropriately driving a heater and a fan at the time of the analysis.

In the sample introduction unit 4, a sample vaporization chamber 7 is formed. During the analysis, a carrier gas is supplied to the sample vaporization chamber 7, and the sample vaporized in the sample vaporization chamber 7 is introduced into the column 2 together with the carrier gas.

The detector 5 is composed of, for example, a hydrogen flame ionization type detector or a flame photometric detector. The detector 5 sequentially detects each sample component contained in the carrier gas introduced from the column 2.

The flow adjustment unit 6 is equipped with AFCs (Advanced Flow Controller) 8, which are examples of a plurality (for example, six) flow controllers, and a holder 9.

The plurality of AFCs 8 include a carrier gas controller 81 for controlling the flow rate of the carrier gas and an $H_2$ gas controller 82 for controlling the flow rate of the $H_2$ gas as an example of the detection gas.

The carrier gas controller 81 is equipped with a flow path member 811, a valve 812, a flow rate sensor 813, and a pressure sensor 814.

As will be described later, the flow path member 811 is composed of a plurality of metal plates, and a flow path for a carrier gas is formed therein.

The valve 812 is attached to the flow path member 811. The valve 812 is composed of, for example, a solenoid valve and is connected to the flow path for the carrier gas in the flow path member 811.

The flow rate sensor 813 is attached to the flow path member 811. The flow rate sensor 813 is connected to the flow path in the flow path member 811. The flow rate sensor 813 is arranged on the downstream side of the valve 812 in the flowing direction of the carrier gas.

The pressure sensor 814 is attached to the flow path member 811. The pressure sensor 814 is connected to the flow path in the flow path member 811. The pressure sensor 814 is connected to the downstream side of the flow rate sensor 813 in the flow direction of the carrier gas.

As the carrier gas, for example, an inert gas, such as, e.g., a He gas and a $N_2$ gas, is used.

The $H_2$ gas controller 82 is equipped with a flow path member 821, a valve 822, a flow rate sensor 823, and a pressure sensor 824. The $H_2$ gas controller 82 has substantially the same configuration as that of the carrier gas controller 81 except that the gas whose flow rate is to be controlled is a $H_2$ gas. That is, the flow path member 821, the valve 822, the flow rate sensor 823, and the pressure sensor 824 of the $H_2$ gas controller 82 respectively correspond to the flow path member 811, the valve 812, the flow rate sensor 813, and the pressure sensor 814 of the carrier gas controller 81.

The holder 9 holds a plurality of AFCs 8 so as to positionally fix them.

When measuring a sample in the gas chromatograph 1, the valve 812 is opened in the carrier gas controller 81 and the valve 822 is opened in the $H_2$ gas controller 82.

In addition, a sample as an object target is injected into the sample introduction unit 4. The sample is vaporized in the sample vaporization chamber 7.

A carrier gas is supplied to the sample vaporization chamber 7 via the carrier gas controller 81.

The sample vaporized in the sample vaporization chamber 7 is introduced into the column 2 together with the carrier gas. Each sample component contained in the sample is separated in the process of passing through the column 2 and sequentially introduced to the detector 5.

In the detector 5, each sample component contained in the carrier gas introduced from the column 2 is sequentially detected. A gas chromatogram is generated based on the detection result of the detector 5.

At this time, in the carrier gas controller 81, the flow rate and the pressure of the carrier gas are detected by the flow rate sensor 813 and the pressure sensor 814. Based on the flow rate and the pressure of the detected carrier gas, the valve 812 is feedback-controlled so that the flow rate of the carrier gas becomes a predetermined amount.

Further, a $H_2$ gas is appropriately introduced into the detector 5 via the $H_2$ gas controller 82.

At this time, in the $H_2$ gas controller 82, on the basis of the flow rate and the pressure of the $H_2$ gas detected by the flow rate sensor 823 and the pressure sensor 824, the valve 822 is feedback-controlled so that the flow rate of the $H_2$ gas becomes a predetermined amount.

Although not illustrated, a split gas or a purge gas is appropriately introduced from the sample introduction unit 4 to the carrier gas controller 81. When introducing a carrier gas and a sample into the column 2 by a split introduction method, a part of the gas (a mixed gas of the carrier gas and the sample) in the sample vaporization chamber 7 is discharged as a split gas at a predetermined split ratio to the outside and is led to the carrier gas controller 81. Undesirable components arising from a septum and the like are discharged to the outside together with the purge gas which is a part of the gas in the sample vaporization chamber 7 and guided to the carrier gas controller 81.

2. Specific Configuration of Flow Adjustment Unit (1) Carrier Gas Controller

Figure 2:
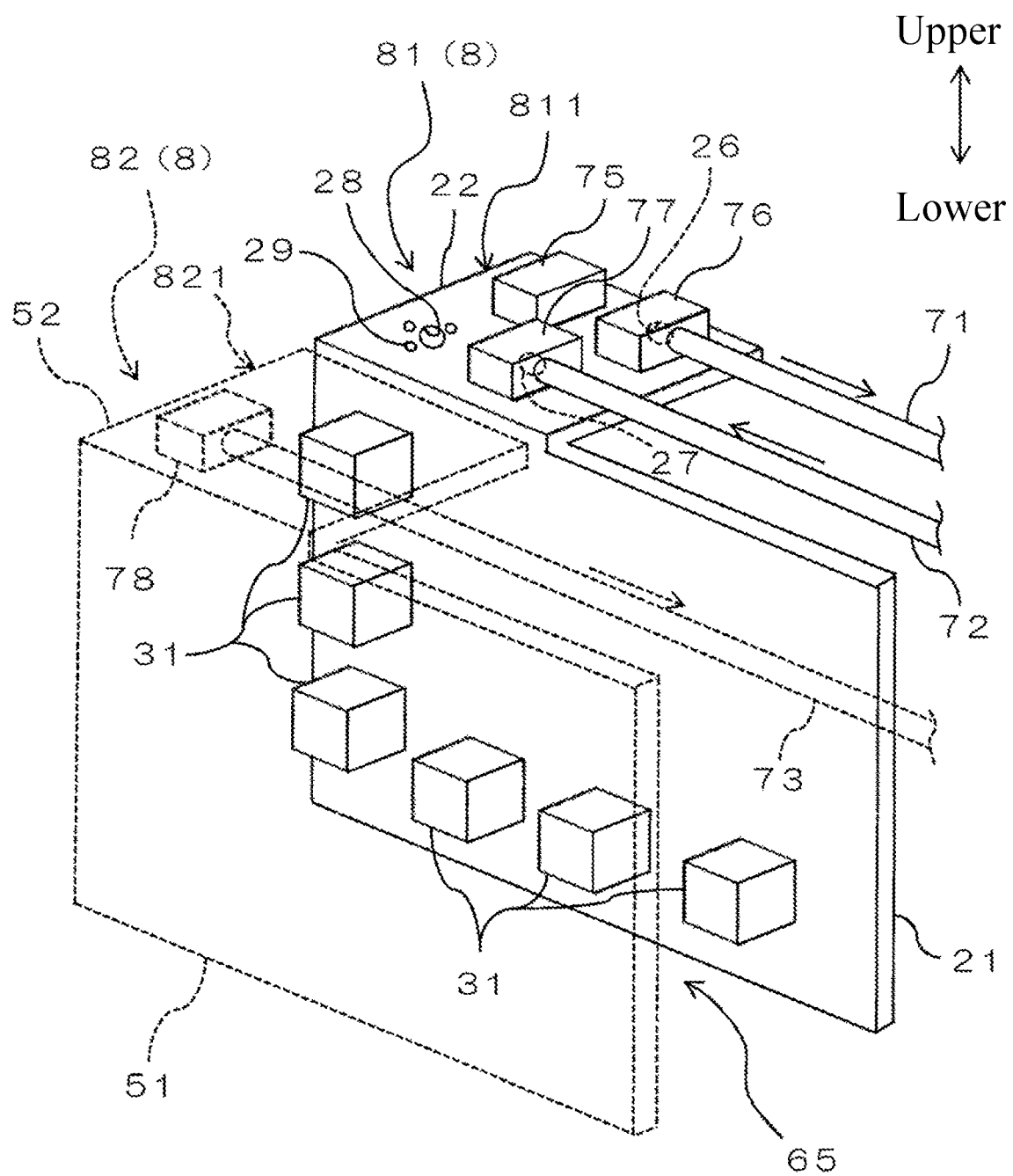
FIG. 2 is a perspective view showing the flow controller of FIG. 1.
Figure 3:
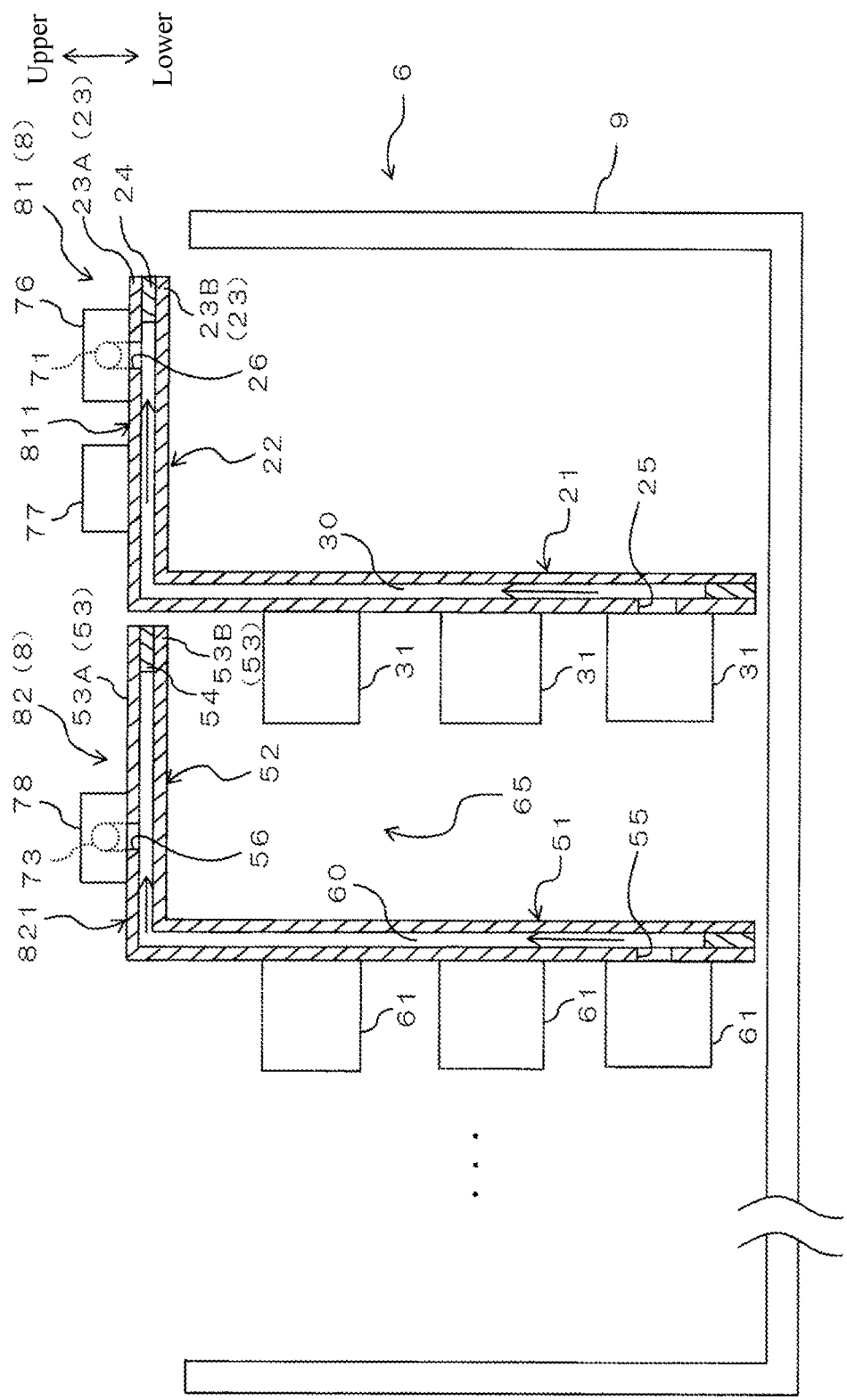
FIG. 3 is a side cross-sectional view showing the flow adjustment unit of FIG. 1.

FIG. 2 is a perspective view showing the AFC 8 shown in FIG. 1. FIG. 3 is a side cross-sectional view showing the flow adjustment unit 6 shown in FIG. 1.

As described above, the carrier gas controller 81 has the flow path member 811.

The flow path member 811 is formed in a substantially L-shape in a side view and is equipped with a first portion 21 and a second portion 22.

The first portion 21 is formed in a substantially rectangular plate shape.

The second portion 22 extends in the horizontal direction continuously from the upper end portion of one side of the first portion 21 in the horizontal direction. The second portion 22 is formed in a substantially rectangular plate shape. The angle formed between the second portion 22 and the first portion 21 on the lower side of the first portion 21 is approximately 90°.

That is, the flow path member 811 is sectioned into the first portion 21 and the second portion 22 by bending a plate-shaped member made of metal. The second portion 22 is disposed above the first portion 21.

Further, as shown in FIG. 3, the flow path member 811 is configured by laminating three metal plates. That is, the flow path member 811 has a three-layer structure. The flow path member 811 has a pair of outer plates 23 and an intermediate plate 24 as a layer structure.

Each of the pair of outer plates 23 constitutes the outer side (surface side) of the flow path member 811, and is composed of one metal plate. Of the pair of outer plates 23, the outer plate 23 in which the second portion 22 is disposed on the upper side is a first outer plate 23A, and the outer plate 23 in which the second portion 22 is disposed on the lower side is the second outer plate 23B. Of the pair of outer plates 23, in the first outer plate 23A, a gas supply port 25, a gas outlet port 26, and a gas inlet port 27 (see FIG. 2) are formed as through-holes. In the first outer plate 23A, in addition to the above-mentioned through-holes, one or a plurality of through-holes 28 (see FIG. 2) are formed. An intermediate plate 24 is interposed between the pair of outer plates 23 (between the first outer plate 23A and the second outer plate 23B).

The gas supply port 25 is located in the first portion 21 of the first outer plate 23A. The gas supply port 25 penetrates the first outer plate 23A in the thickness direction.

The gas outlet port 26 is arranged in the second portion 22 of the first outer plate 23A. The gas outlet port 26 penetrates the first outer plate 23A in the thickness direction.

As shown in FIG. 2, the gas inlet port 27 is arranged in the second portion 22 of the first outer plate 23A (see FIG. 3) so as to be spaced apart from the gas outlet port 26. The gas inlet port 27 penetrates the first outer plate 23A in the thickness direction.

The through-hole 28 is arranged at the second portion 22 in the first outer plate 23A (see FIG. 3) so as to be spaced apart from the gas outlet port 26 and the gas inlet port 27. The through-hole 28 penetrates the first outer plate 23A in the thickness direction. Screw holes 29 are formed around the through-hole 28. In FIG. 2, only one through-hole 28 is illustrated, but a plurality of through-holes 28 may be formed in the second portion 22 of the first outer plate 23A. Although not illustrated in FIGS. 2 and 3, screw holes are formed around the gas supply port 25, the gas outlet port 26 and the gas inlet port 27 similarly to the through-hole 28.

As shown in FIG. 3, the intermediate plate 24 constitutes the inner side of the flow path member 811, and is formed of one metal plate. The intermediate plate 24 is provided with a plurality of grooves.

A pair of the outer plates 23 and the intermediate plate 24 are diffusion bonded to each other, so that the flow path member 811 is formed.

With this, in the flow path member 811, one of the plurality of grooves of the intermediate plate 24 constitutes a flow path 30 connecting the gas supply port 25 and the gas outlet port 26. In the same manner, although not illustrated, in the flow path member 811, another groove of the plurality of grooves of the intermediate plate 24 constitutes a flow path communicating with the gas inlet port 27. Further, in the flow path member 811, another groove among the plurality of grooves of the intermediate plate 24 constitutes a flow path communicating with the through-hole 28.

In this manner, a plurality of flow paths are formed in the flow path member 811 by a plurality of grooves formed on the intermediate plate 24.

In FIG. 3, for convenience of explanation, the flow path 30 is schematically illustrated, but the shape of each of the plurality of flow paths in the flow path member 811 is formed in, for example, a polygonal line shape or a curved shape.

A plurality of parts 31 are attached to the first portion 21 of the flow path member 811 configured as described above. The plurality of parts 31 is exemplified by the above-described valve 812, flow rate sensor 813, pressure sensor 814, and the like. One of the plurality of parts 31 is a gas supply connector, and is attached to the first portion 21 so as to cover the gas supply port 25.

(2) $H_2$ Gas Controller

As described above, the $H_2$ gas controller 82 is equipped with the flow path member 821. The flow path member 821 has almost the same configuration as that of the flow path member 811 of the carrier gas controller 81.

That is, the flow path member 821 is provided with a first portion 51 and a second portion 52 extending from the upper end portion of the first portion 51. Further, the flow path member 821 has a three-layer structure formed by diffusion bonding a pair of outer plates 53 and an intermediate plate 54. One of the pair of outer plates 53 is a first outer plate 53A, and the other of the pair of outer plates 53 is a second outer plate 53B.

The first portion 51, the second portion 52, the pair of outer plates 53, the first outer plate 53A, the second outer plate 53B, and the intermediate plate 54 in the flow path member 821 correspond to the first portion 21, the second portion 22, a pair of outer plates 23, the first outer plate 23A, the second outer plate 23B, and the intermediate plate 24, respectively. A plurality of grooves is formed on the intermediate plate 54 of the flow path member 821, but the shapes of these grooves are different from the grooves formed on the intermediate plate 24 of the flow path member 811.

In the first outer plate 53A, a gas supply port 55 and a gas outlet port 56 are formed as through-holes. Although not illustrated, one or more through-holes may be formed in the first outer plate 53A in addition to the through-holes as described above.

The gas supply port 55 is located at the first portion 51 in the first outer plate 53A. The gas supply port 55 penetrates the first outer plate 53A in the thickness direction.

The gas outlet port 56 is arranged in the second portion 52 of the first outer plate 53A. The gas outlet port 56 penetrates the first outer plate 53A in the thickness direction.

In the flow path member 821, one of the plurality of grooves of the intermediate plate 54 constitutes a flow path 60 connecting the gas supply port 55 and the gas outlet port 56. Although not illustrated, in the same manner as the flow path member 811, a plurality of flow paths other than the flow path 60 are formed in the flow path member 821 by a plurality of grooves formed on the intermediate plate 54.

A plurality of parts 61 is attached to the first portion 51 of the flow path member 821. The plurality of parts 61 is exemplified by the above-described valve 822, flow rate sensor 823, pressure sensor 824, and the like. One of the plurality of parts 61 is a gas supply connector, and is attached to the first portion 51 so as to cover the gas supply port 55.

In FIG. 3, for convenience of explanation, the flow path 60 is schematically illustrated, but the shape of each of the plurality of flow paths in the flow path member 821 is formed in, for example, a polygonal line shape or a curved shape.

(3) Holder

As shown in FIG. 3, the holder 9 is formed in a rectangular frame shape with its upper part opened. The holder 9 holds (accommodates) a plurality of AFCs 8 arranged in parallel. More specifically, the holder 9 holds the carrier gas controller 81 and the $H_2$ gas controller 82 adjacent to each other.

In a state in which the holder 9 holds a plurality of AFCs 8, the first portion 21 of the carrier gas controller 81 and the first portion 51 of the $H_2$ gas controller 82 are arranged so as to be parallel with each other. The second portion 22 of the carrier gas controller 81 and the second portion 52 of the $H_2$ gas controller 82 are arranged above the upper end portion of the holder 9. The space enclosed by the first portion 21 of the carrier gas controller 81 and the first portion 51 and the second portion 52 of the $H_2$ gas controller 82 forms an accommodation space 65. The plurality of parts 31 of the carrier gas controller 81 are accommodated in the accommodation space 65 formed between the $H_2$ gas controller 82 and the adjacent $H_2$ gas controller 82.

3. Connection of Pipes and Installation of Filter

Figure 4:
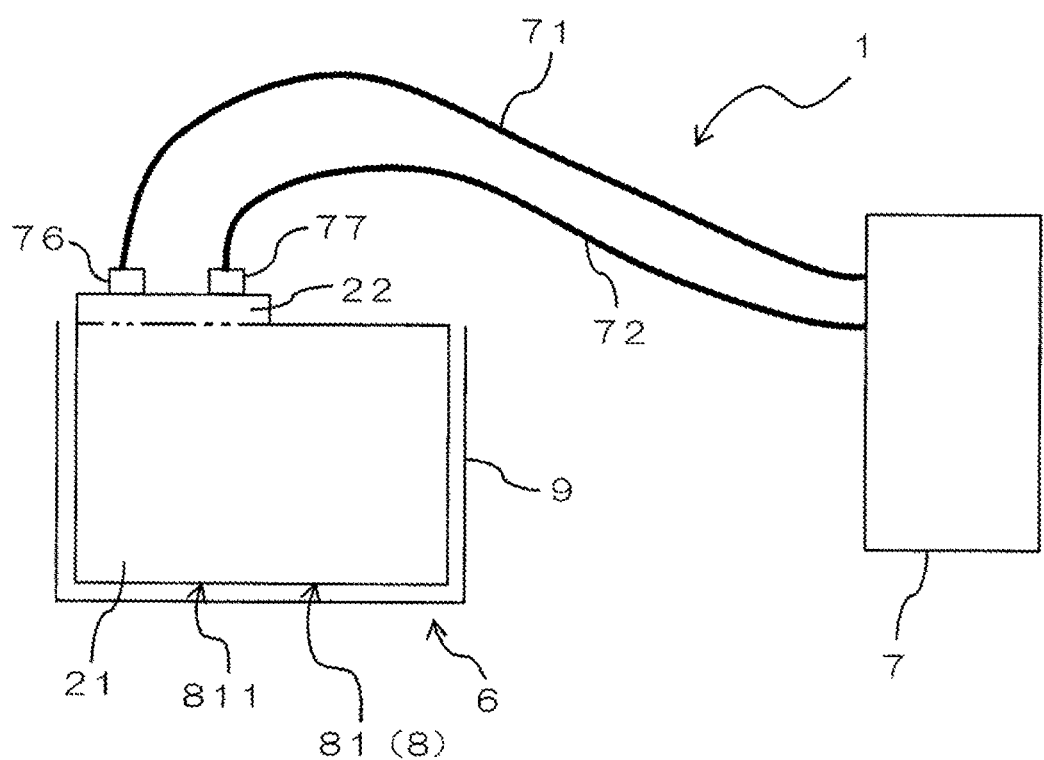
FIG. 4 is a conceptual diagram showing a configuration of a flow adjustment unit and the vicinity thereof in the gas chromatograph of FIG. 1.
Figure 5:
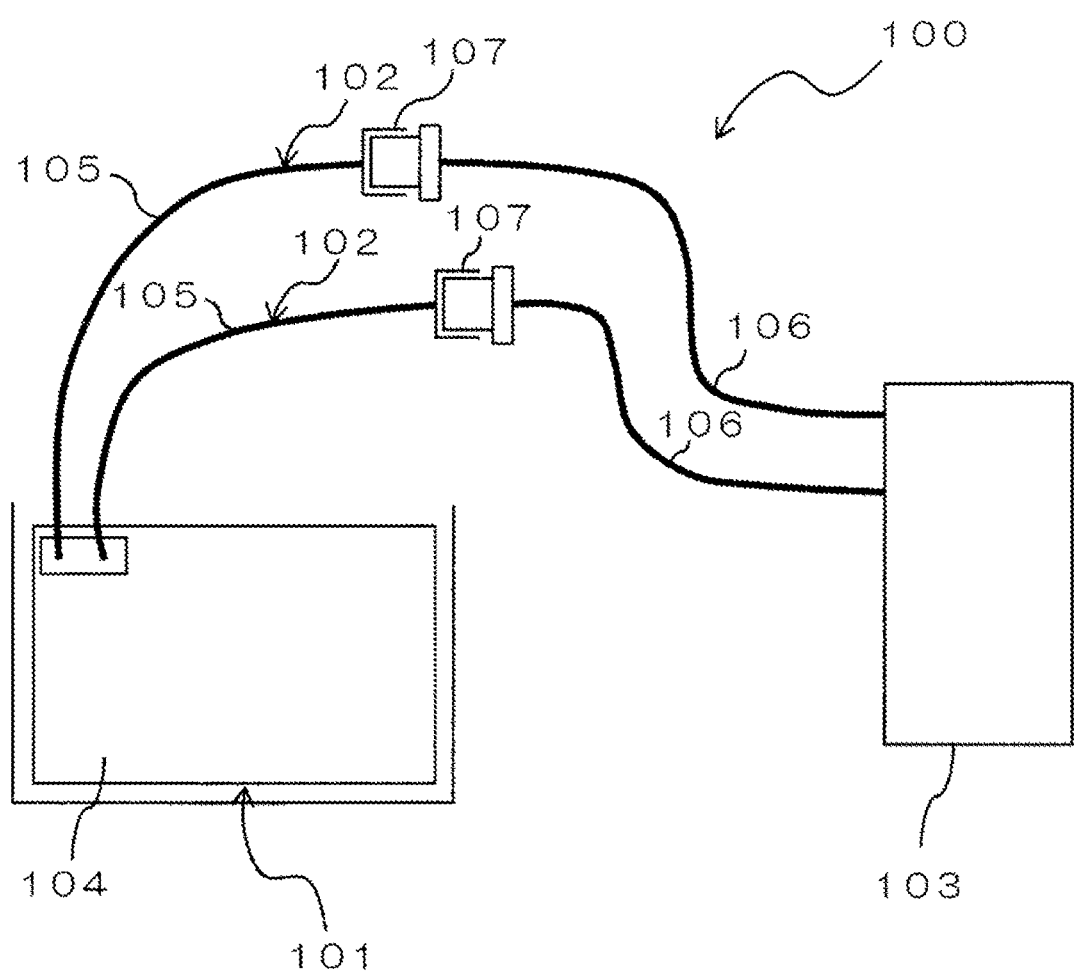
FIG. 5 is a conceptual diagram showing a configuration of a flow controller and the vicinity thereof in a conventional gas chromatograph.

FIG. 4 illustrates a conceptual diagram showing the configuration of the flow adjustment unit 6 and the vicinity thereof in the gas chromatograph 1.

From the state in which the plurality of AFCs 8 is held in the holder 9, as shown in FIG. 1, the carrier gas controller 81 and the sample introduction unit 4 are connected and the H$_2$ gas controller 82 and the detector 5 are connected to each other.

Specifically, as shown in FIG. 4, a first pipe 71 and a second pipe 72 extending from the sample vaporization chamber 7 of the sample introduction unit 4 are directly connected to the carrier gas controller 81.

At the tip end of the first pipe 71, a first block 76 is arranged. In the first block 76, a space communicating with the first pipe 71 is formed. As shown in FIG. 2, the first block 76 is fixed to the second portion 22 of the carrier gas controller 81 by screwing so as to cover the gas outlet port 26. That is, the first pipe 71 is directly connected to the second portion 22 via the first block 76 so as to communicate with the gas outlet port 26.

As a result, as shown in FIG. 3, the flow path 30 in the flow path member 811 and the first pipe 71 are communicated with each other.

As shown in FIG. 4, a second block 77 is arranged at the tip end of the second pipe 72. In the second block 77, a space communicating with the second pipe 72 is formed. As shown in FIG. 2, the second block 77 is fixed to the second portion 22 of the carrier gas controller 81 by screwing so as to cover the gas inlet port 27. That is, the second pipe 72 is directly connected to the second portion 22 via the second block 77 so as to communicate with the gas inlet port 27.

As a result, the flow path (not illustrated) in the flow path member 811 and the second pipe 72 are communicated with each other.

As shown in FIG. 2, the filter 75 is directly attached to the second portion 22 of the carrier gas controller 81. Specifically, the filter 75 is attached directly to the second portion 22 so as to intervene in a flow path (not illustrated) in the flow path member 811.

As shown in FIGS. 2 and 3, a third pipe 73 extending from the detector 5 (see FIG. 1) is directly connected to the H$_2$ gas controller 82.

At the tip end of the third pipe 73, a third block 78 is arranged. In the third block 78, a space communicating with the third pipe 73 is formed. As shown in FIG. 3, the third block 78 is fixed to the second portion 52 of the H$_2$ gas controller 82 by screwing so as to cover the gas outlet port 56. That is, the third pipe 73 is directly connected to the second portion 52 via the third block 78 so as to communicate with the gas outlet port 56.

As a result, as shown in FIG. 3, the flow path 60 in the flow path member 821 and the third pipe 73 are communicated with each other.

When measuring a sample in the gas chromatograph 1, a carrier gas is supplied from the gas supply port 25 to the carrier gas controller 81. The carrier gas passes through the flow path 30, flows out of the gas outlet port 26, and flows into the sample vaporization chamber 7 via the first pipe 71.

From the sample vaporization chamber 7, a split gas or a purge gas passes through the second pipe 72 and flows from the gas inlet port 27 to the flow path in the flow path member 811 of the carrier gas controller 81.

Impurities contained in the gas flowing through the flow path in the flow path member 811 are removed by the filter 75. The filter 75 may be a carrier gas purification filter for removing impurities from the gas flowing through the flow path 30 by being connected to the flow path 30 communicating with the gas outlet port 26, or may be an exhaust gas purification filter for removing impurities from the gas flowing through the flow path by being connected to a flow path communicating with the gas inlet port 27.

Further, in the H$_2$ gas controller 82, a H$_2$ gas is supplied to the inside from the gas supply port 55. The H$_2$ gas passes through the flow path 60, flows out of the gas outlet port 56, and flows into the detector 5 via the third pipe 73.

Although not illustrated, a filter may also be directly attached to the second portion 52 of the H$_2$ gas controller 82. In this case, the filter may be a detection gas purification filter for removing impurities from the gas flowing through the flow path by being connected to a flow path communicating with the gas outlet port 56.

4. Functions and Effects (1) In this embodiment, as shown in FIG. 3, in the carrier gas controller 81, the second portion 22 extends in the horizontal direction from the upper end portion of the first portion 21. The angle formed between the second portion 22 and the first portion 21 and formed on the lower side of the first portion 21 is approximately 90°. In the second portion 22, a gas outlet port 26 is formed.

Similarly, in the H$_2$ gas controller 82, the second portion 52 extends in the horizontal direction from the upper end portion of the first portion 51. The angle formed between the second portion 52 and the first portion 51 and formed on the lower side of the first portion 51 is approximately 90°. In the second portion 52, a gas outlet port 56 is formed.

Therefore, a working space for the gas outlet port 26 can be sufficiently secured above the carrier gas controller 81. In other words, the workability with respect to the carrier gas controller 81 can be kept high.

In the same manner, a working space for the gas outlet port 56 can be sufficiently secured above the H$_2$ gas controller 82. In other words, the workability with respect to the H$_2$ gas controller 82 can be kept high.

In the carrier gas controller 81, the first pipe 71 is directly connected to the second portion 22 of the carrier gas controller 81 so as to communicate with the gas outlet port 26 via the first block 76.

Therefore, it is unnecessary to connect the first pipe 71 to another pipe between the carrier gas controller 81 and the sample introduction unit 4, which in turn can eliminate other pipes, and members for connecting the first pipe 71 to other pipes.

Therefore, it becomes possible to suppress contamination of impurities into the carrier gas, which can improve the measurement accuracy. In addition, the number of connecting portions is reduced, which in turn can reduce the possibility of carrier gas leakage. Furthermore, since the number of parts can be reduced, the manufacturing cost can be reduced.

(2) Further, in this embodiment, as shown in FIG. 2, a gas inlet port 27 is formed in the second portion 22 in the carrier gas controller 81.

Therefore, a working space for the gas inlet port 27 can be sufficiently secured above the carrier gas controller 81. In other words, the workability with respect to the carrier gas controller 81 can be further kept high.

In the carrier gas controller 81, the second pipe 72 is directly connected to the second portion 22 of the carrier gas controller 81 so as to communicate with the gas inlet port 27 via the second block 77.

Therefore, it is unnecessary to connect the second pipe 72 to another pipe between the carrier gas controller 81 and the sample introduction unit 4, which can eliminate other pipes, and members for connecting the second pipe 72 to other pipes.

(3) Further, in this embodiment, as shown in FIG. 2, in the carrier gas controller 81, the filter 75 is directly attached to the second portion 22.

Therefore, a working space for attaching and detaching the filter 75 can be sufficiently ensured above the carrier gas controller 81, which can keep the workability for the carrier gas controller 81 higher.

In addition, it is possible to further suppress contamination of impurities into the gas flowing through the flow path member 811 by the filter 75, which in turn can further improve the measurement accuracy.

(4) Further, as shown in FIG. 2, in the $H_2$ gas controller 82, the third pipe 73 is directly connected to the second portion 52 of the $H_2$ gas controller 82 so as to communicate with the gas outlet port 56 (see FIG. 3) via the third block 78.

Therefore, it is unnecessary to connect the third pipe 73 to another pipe between the $H_2$ gas controller 82 and the detector 5, which can eliminate other pipes, and members for connecting the third pipe 73 to other pipes.

Therefore, it becomes possible to suppress contamination of impurities into the $H_2$ gas, which in turn can improve the measurement accuracy. In addition, the number of connecting portions is reduced, which in turn can reduce the possibility of the $H_2$ gas leakage. Furthermore, since the number of parts can be reduced, the manufacturing cost can be reduced.

(5) Further, in this embodiment, as shown in FIG. 3, in a state in which the holder 9 holds a plurality of AFCs 8, the first portion 21 of the carrier gas controller 81 and the first portion 51 of the $H_2$ gas controller 82 are arranged so as to be parallel with each other. The second portion 22 of the carrier gas controller 81 and the second portion 52 of the $H_2$ gas controller 82 are arranged above the upper end portion of the holder 9.

Therefore, even if the dimension between the first portion 21 of the carrier gas controller 81 and the first portion 51 of the $H_2$ gas controller 82 is small, the working spaces for the second portion 22 of the carrier gas controller 81 and the second portion 52 of the $H_2$ gas controller 82 can be sufficiently secured.

As a result, the workability with respect to the carrier gas controller 81 and the $H_2$ gas controller 82 can be kept higher.

(6) Further, in this embodiment, as shown in FIG. 3, the space enclosed by the first portion 21 of the carrier gas controller 81 and the first portion 51 and the second portion 52 of the $H_2$ gas controller 82 forms an accommodation space 65. The plurality of parts 31 of the carrier gas controller 81 are accommodated in the accommodation space 65.

Therefore, the space inside the gas chromatograph 1 can be effectively utilized, which in turn can realize the downsizing of the gas chromatograph 1.

5. Modified Embodiment

In the aforementioned embodiment, although it is described such that the plurality of AFCs 8 of the flow adjustment unit 6 includes the carrier gas controller 81 and the $H_2$ gas controller 82, all of the plurality of AFCs 8 of the flow adjustment unit 6 may be carrier gas controllers 81. In this case, the detector 5 is not limited to a detector to which a gas is supplied from the flow adjustment unit 6, but may be another detector such as a thermal conductivity type detector, an electron capture type detector, a mass spectrometer, or the like.

The carrier gas controllers 81 adjacent to each other may be arranged such that the first portions 21 are parallel to each other. A space surrounded by the first portion 21 and the second portion 22 of one of the carrier gas controllers 81 adjacent to each other and the first portion 21 of the other carrier gas controller 81 may form an accommodation space 65. In cases where the $H_2$ gas controllers 82 are adjacent to each other, the space enclosed by the first portion 51 and the second portion 52 of the $H_2$ gas controller 82 of one of the adjacent $H_2$ gas controllers 82 and the first portion 51 of the $H_2$ gas controller 82 may form an accommodation space 65.

In the aforementioned embodiment, although it is described such that the gas outlet port 26 and the gas inlet port 27 are formed in the second portion 22 of the carrier gas controller 81, it may be configured such that only the gas outlet port 26 is formed in the second portion 22.

Further, in the aforementioned embodiment, although it is described such that the flow path member 811 of the carrier gas controller 81 and the flow path member 821 of the $H_2$ gas controller 82 are composed of three metal plates, it may be configured such that these are composed of a plurality of stacked metal plates, for example, two or four or more stacked metal plates.

Further, in the aforementioned embodiment, although it is described such that the flow controllers are the carrier gas controller 81 and the $H_2$ gas controller 82, the flow controller is not limited to a flow controller for a carrier gas or a flow controller for a detector. The gas supplied to the flow controller is not limited to a carrier gas or a $H_2$ gas. The gas flowing out of the gas outlet port of the flow controller may be introduced not only to the sample vaporization chamber 7 or the detector 5 but also to other members. Further, a gas not from the sample vaporization chamber 7 but from other outer parts may flow into the gas inlet port of the flow controller.

The angle formed by the first portion 21 and the second portion 22 of the carrier gas controller 81 and the angle formed by the first portion 51 and the second portion 52 of the $H_2$ gas controller 82 are not limited to approximately 90° and may be arbitrarily set to any angle within the range in which the effects f the present invention can be exerted.

DESCRIPTION OF REFERENCE SYMBOLS 1 gas chromatograph
2 column
4 sample introduction unit
5 detector
7 sample vaporization chamber
8 AFC
9 holder
21 first portion
22 second portion
23 outer plate
23A first outer plate
23B second outer plate
24 intermediate plate
25 gas supply port
26 gas outlet port
27 gas inlet port
30 flow path
31 parts
51 first portion
52 second portion 53 outer plate
53A first outer plate
53B second outer plate
54 intermediate plate
55 gas supply port
56 gas outlet port
60 flow path
61 parts
65 accommodation space
71 first pipe
72 second pipe
73 third pipe
75 filter
81 carrier gas controller
82 H$_2$ gas controller
811 flow path member
821 flow path member

The invention claimed is:

1. A first flow controller for controlling a flow rate of a gas used for a gas chromatograph, comprising:
   a first flow path member constituted by a plurality of laminated plates and having a flow path formed therein, wherein
   the first flow path member is sectioned by a bend of the plurality of laminated plates of the flow path member into a first portion and a second portion,
   with respect to a side cross-sectional view of the first flow path member of a cross section that extends through the plurality of laminated plates, the first portion extends in a first direction and the second portion extends in a second direction from an end of the first portion, the second direction being different from the first direction,
   a gas supply port to which the gas is supplied is formed in the first portion, and
   a gas outlet port through which the gas supplied from the gas supply port and passed through the flow path flows out is formed in the second portion.

2. The flow controller as recited in claim 1,
   wherein a gas inlet port into which a gas from an outside flows is formed in the second portion.

3. The flow controller as recited in claim 2, further comprising:
   a filter directly attached to the second portion, the filter being configured to remove impurities from the gas flowing through the flow path.

4. The flow controller as recited in claim 1, further comprising:
   a filter directly attached to the second portion, the filter being configured to remove impurities from the gas flowing through the flow path.

5. The flow controller as recited in claim 1, wherein with respect to the side cross-sectional view, the first flow path member has an "L" shape.

6. The flow controller as recited in claim 1, wherein
   the plurality of laminated plates of the first flow path member comprises a pair of bent outer plates forming respective outer sides of the first flow path member,
   the flow path is disposed between the outer plates, and
   the outer plates extend in the first direction in the side cross-sectional view and form outer sides of the first portion and extend in the second direction in the side cross-sectional view and form outer sides of the second portion.

7. The flow controller as recited in claim 1, further comprising an intermediate plate interposed between the pair of outer plates, the intermediate plate comprising at least one groove to form the flow path.

8. A gas chromatograph comprising:
   the flow controller as recited in claim 1;
   a column into which a sample is introduced;
   a sample introduction unit in which a sample vaporization chamber for vaporizing the sample to be introduced into the column is formed; and
   a detector configured to detect sample components separated in a process of passing through the column.

9. The gas chromatograph as recited in claim 8, further comprising:
   a first pipe for sending a carrier gas from the flow controller to the sample introduction unit,
   wherein the first pipe is directly connected to the second portion so as to communicate with the gas outlet port.

10. The gas chromatograph as recited in claim 9, wherein
    a gas inlet port into which a gas from an outside flows is formed in the second portion,
    a second pipe for sending a split gas or a purge gas from the sample introduction unit to the flow controller is further provided, and
    the second pipe is directly connected to the second portion so as to communicate with the gas inlet port.

11. The gas chromatograph as recited in claim 10, wherein
    the first flow controller is one of a plurality of flow controllers, and
    a holder for holding the plurality of flow controllers is further provided such that the first portions of the plurality of flow controllers are disposed parallel to each other.

12. The gas chromatograph as recited in claim 9, wherein
    the flow controller is one of a plurality of flow controllers provided with the gas chromatograph, and
    a holder for holding the plurality of flow controllers is further provided such that the first portions of the plurality of flow controllers are disposed parallel to each other.

13. The gas chromatograph as recited in claim 8, further comprising:
    a second flow controller for controlling a flow rate of a detection gas used for the gas chromatograph, comprising:
    a second flow path member constituted by a second plurality of laminated plates and having a second flow path formed therein, wherein
    the second flow path member is sectioned by a bend of the second plurality of laminated plates of the second flow path member into a first portion and a second portion
    the cross section of the cross-sectional view extends through the second plurality of laminated plates
    with respect to the side cross-sectional view, the first portion of the second flow path member extends in the first direction and the second portion of the second flow path member extends in the second direction,
    a second gas supply port to which the detection gas is supplied is formed in the first portion of the second flow path member, and
    a second gas outlet port through which the detection gas supplied from the second gas supply port and passed through the second flow path flows out is formed in the second portion of the second flow path member, wherein:
    a third pipe for sending the detection gas from the second flow controller to the detector is further provided, and
    the third pipe is directly connected to the second portion of the second portion of the second flow path member so as to communicate with the second gas outlet port.

14. The gas chromatograph as recited in claim 13, wherein
the first flow controller is one of a plurality of flow controllers, and
a holder for holding the plurality of flow controllers is further provided such that the first portions of the plurality of flow controllers are disposed parallel to each other.

15. The gas chromatograph as recited in claim 8, wherein
the first flow controller is one of a plurality of flow controllers, and
a holder for holding the plurality of flow controllers is further provided such that the first portions of each of the plurality of flow controllers are disposed parallel to each other.

16. The gas chromatograph as recited in claim 15, wherein
a space surrounded by the first portion and the second portion of one of the plurality of flow controllers parallel to each other and the first portion of another flow controller forms an accommodation space for accommodating a plurality of parts to be attached to the first portion of another flow controller.

17. The gas chromatograph as recited in claim 16, wherein the plurality of parts comprises at least one of: a valve, a flow rate sensor, a pressure sensor, and a gas supply connector.

18. The gas chromatograph as recited in claim 16, wherein the plurality of parts comprises: a valve, a flow rate sensor, a pressure sensor, and a gas supply connector.

* * * * *